United States Patent Office 3,020,308
Patented Feb. 6, 1962

3,020,308
PREPARATION OF TRIALKYL BORATES FROM SODIUM PENTABORATE OR BORAX
Hugo Stange, Niagara Falls, N.Y., assignor, by mesne assignments, to Olin Mathieson Chemical Corporation, a corporation of Virginia
No Drawing. Filed Aug. 2, 1954, Ser. No. 447,380
7 Claims. (Cl. 260—462)

My invention relates to a process for the preparation of certain lower trialkyl borates.

Such borates are commercially useful forms of boron and can be employed for a wide variety of purposes. My invention provides a method whereby those compounds can be conveniently prepared using a sodium pentaborate and an appropriate alcohol as starting materials. Sodium pentaborate containing water of crystallization can be readily manufactured by reacting borax and carbon dioxide in aqueous solution to precipitate sodium bicarbonate and leave an aqueous solution of sodium pentaborate, from which the sodium pentaborate can be conveniently recovered. Since borax itself is a commercial boron-containing material derived from ores, my invention makes possible the manufacture of lower trialkyl borates from boron ores and is particularly valuable in view of the high yield of trialkyl borate realized when the sodium pentaborate and alcohol are reacted.

Thus, in accordance with my present invention, I have discovered that lower trialkyl borates can be prepared readily and in a high yield by heating an admixture of a sodium pentaborate and a saturated aliphatic monohydric alcohol having from 1 to 5 carbon atoms and distilling from the reaction mixture the trialkyl borate formed. When this procedure is carried out, the yield of product, based upon sodium pentaborate, is of the order of about 70 or 75 percent and is much greater than the yield encountered when borax is used in a similar process in place of the sodium pentaborate. For example, when borax is used as a starting material, rather than the sodium pentaborate, the yield of ester produced, based upon borax, is of the order of about 25 or 30 percent.

The following examples illustrate in detail certain embodiments which fall within the scope of my invention and are to be considered not limitative.

*Example I*

This example illustrates the preparation of trimethyl borate from sodium pentaborate pentahydrate and methanol.

The apparatus employed consisted of a 1000 ml., 3-necked flask equipped with a stirring assembly. An additional funnel was fitted in one neck of the flask, and a short distillation column packed with glass helices, a variable take-off distillation head, a vacuum adapter and a receiver were fitted in series to the other neck of the flask. A U-tube submerged in a Dry Ice-acetone bath was attached to the vacuum adapter outlet.

A mixture of 0.125 gram mole of sodium pentaborate and 15.0 gram moles of methanol was placed in the flask and the mixture was heated with stirring. The temperature was gradually raised until the trimethyl borate-methanol azeotrope distilled over at a temperature range of 54–64° C. During the distillation, the volume of methanol present in the flask was maintained relatively constant by the addition of fresh methanol. Analysis of the trimethyl borate-methanol azeotrope by hydrolyzing a portion with mannitol and titrating the boric acid formed with standard base showed a 73 percent conversion of the sodium pentaborate pentahydrate to trimethyl borate.

*Example II*

In this example the procedure of Example I was repeated, with the exception that the sodium pentaborate used was calcined (anhydrous) sodium pentaborate and also with the exception that 16.2 gram moles of methanol was used. The percent conversion of the sodium pentaborate to trimethyl borate amounted to 72 percent.

Various modifications can be made in the procedures of the specific examples set forth above to provide other embodiments which fall within the scope of my invention. Thus, in place of the methanol employed there can be substituted other saturated aliphatic monohydric alcohols having from 1 to 5 carbon atoms, such as ethyl alcohol, normal propyl alcohol, normal butyl alcohol, isobutyl alcohol, normal amyl alcohol and the like. Furthermore, considerable variation can be made in the reaction conditions. For example, the relative amounts of sodium pentaborate and alcohol taken is not critical and can be varied widely. In general, however, I prefer that the reaction mixture contain from about 15 to about 130 moles of alcohol per mole of sodium pentaborate.

I claim:

1. A method for preparing a trialkyl borate which comprises heating an admixture of a sodium pentaborate selected from the group consisting of hydrated sodium pentaborates and anhydrous sodium pentaborate and a saturated aliphatic monohydric alcohol having from 1 to 5 carbon atoms to a temperature at which a trialkyl borate is formed and distilling the trialkyl borate formed from the reaction mixture.

2. A method according to claim 1 in which the sodium pentaborate is sodium pentaborate pentahydrate.

3. A method according to claim 1 in which the sodium pentaborate is anhydrous sodium pentaborate.

4. A method according to claim 1 in which the alcohol is methanol.

5. A method according to claim 1 in which the alcohol is methanol and in which the admixture contains from about 15 to about 130 moles of methanol per mole of the sodium pentaborate.

6. A method according to claim 1 in which the sodium pentaborate is sodium pentaborate pentahydrate, in which the alcohol is methanol and in which the admixture contains from about 15 to about 130 moles of methanol per mole of the sodium pentaborate.

7. A method of preparing a trialkyl borate which comprises heating a mixture of a compound selected from the group consisting of borax and sodium pentaborate with a lower alkanol to a temperature at which a trialkyl borate is formed and distilling the trialkyl borate formed from the reaction mixture.

References Cited in the file of this patent

UNITED STATES PATENTS

| | | |
|---|---|---|
| 2,331,965 | Dreyfus | Oct. 19, 1943 |
| 2,689,259 | Schechter | Sept. 14, 1954 |

FOREIGN PATENTS

| | | |
|---|---|---|
| 542,528 | Great Britain | Jan. 14, 1942 |